United States Patent [19]
Ferri

[11] Patent Number: 5,299,896
[45] Date of Patent: Apr. 5, 1994

[54] GUN JIG

[76] Inventor: Bernard L. Ferri, 141 Arizona Ave., Trinidad, Colo. 81082

[21] Appl. No.: 19,536

[22] Filed: Feb. 18, 1993

[51] Int. Cl.$^5$ .............................................. B23B 49/02
[52] U.S. Cl. .................... 408/72 R; 408/103; 408/115 R
[58] Field of Search ............... 408/72 R, 72 B, 115 R, 408/115 B, 99, 100, 103, 108–110

[56] References Cited

U.S. PATENT DOCUMENTS 3,537,337 11/1970 Best ................................... 408/72 R
3,589,825 6/1971 Wojcik ............................... 408/72 R

*Primary Examiner*—Steven C. Bishop
*Attorney, Agent, or Firm*—John E. Toupal; Harold G. Jarcho

[57] ABSTRACT

A gun jig including first and second templates defining first and second end surfaces, a first substantially planar surface extending between the first and second end surfaces, a second substantially planar surface oriented substantially perpendicular to the first planar surface and extending between the first and second end surfaces, a first recessed surface extending between the first and second end surfaces, a first plurality of guide holes extending between the first planar surface and the first recessed surface, a second plurality of guide holes extending between the second planar surface and the first recessed surface, a first connecting surface extending between the first and second end surfaces and joining the first planar surface and the first recessed surface, and a second connecting surface extending between the first and second end surfaces and joining the second planar surface and the first recessed surface.

21 Claims, 4 Drawing Sheets

GUN JIG

BACKGROUND OF THE INVENTION

This invention relates generally to a gun jig and, more particularly, to a jig for porting the barrels of shotguns.

Shotguns are used extensively in a wide variety of both sporting and working endeavors including hunting, numerous types of target shooting, and law enforcement. Although highly effective in such applications, shotguns do exhibit an undesirable tendency to recoil in response to excessive barrel pressure generated during firing. Gun recoil and the associated muzzle jump result in flinching that prevents a rapid return to target and reduced shooting comfort. Such gun recoil can be diminished by recoil arrestors consisting of ported barrel extensions that are mounted on the muzzle of a gun barrel. Another known technique for reducing gun recoil entails the cutting of strategically located ports near the muzzle of a gun barrel with, for example, electrical discharge machine apparatus. However, all such prior techniques for reducing gun recoil require the use of expensive equipment and in the case of pre-owned guns the expensive and inconvenient shipment thereof to a factory in which such equipment is available.

The object of this invention, therefore, is to provide a relatively inexpensive portable jig that can be used by gun owners to properly port gun barrels and thereby reduce gun recoil.

SUMMARY OF THE INVENTION

The invention is a gun jig including a first template defining first and second end surfaces, a first substantially planar surface extending between the first and second end surfaces, a second substantially planar surface oriented substantially perpendicular to the first planar surface and extending between the first and second end surfaces, a first recessed surface extending between the first and second end surfaces, a first plurality of guide holes extending between the first planar surface and the first recessed surface, a second plurality of guide holes extending between the second planar surface and the first recessed surface, a first connecting surface extending between the first and second end surfaces and joining the first planar surface and the first recessed surface, and a second connecting surface extending between the first and second end surfaces and joining the second planar surface and the first recessed surface. Also included is a second template defining one and another end surfaces, one substantially planar surface extending between the one and another end surfaces, another substantially planar surface extending between the one and another end surfaces, a second recessed surface extending between the one and another end surfaces, a first plurality of guide apertures extending between the one planar surface and the second recessed surface, a second plurality of guide apertures extending between the another planar surface and the second recessed surface, one connecting surface extending between the one and another end surfaces and joining the one planar surface and the second recessed surface, and another connecting surface extending between the one and another end surfaces and joining the another planar surface and the second recessed surface. With the first and second templates properly positioned on a gun barrel, the guide holes and apertures can be used selectively to drill recoil reducing ports.

According to one feature of the invention, the first and second recessed surfaces are substantially arcuate surfaces. A gun barrel conforms desirably with the arcuate surfaces.

According to other features of the invention, each of the first and second plurality of guide holes and the first and second plurality of guide apertures include parallel rows of, respectively, spaced apart rows of holes and apertures. The parallel rows of holes and apertures facilitate proper porting of a gun barrel.

According to still other features of the invention, each of the first and second templates define a pair of spaced apart clamping surfaces intersecting, respectively, the first and second and one and another planar surfaces between the first and second and one and another end surfaces. The clamping surfaces accommodate a suitable mechanism for clamping the templates on a gun barrel.

According to yet other features, the first connecting surface includes first and second joined stop surfaces extending between the first and second end surfaces and the one connecting surface includes one and another joined surfaces extending between the one and another end surfaces; and the gun jig also includes a spacer bar having first and second end walls and defining a first abutment surface extending between the endwalls, a second abutment surface extending between the endwalls, and an intermediate surface extending between the endwalls and joining the first and second abutment surfaces. By suitably and selectively engaging the first stop surface and the first abutment surface, the one stop surface and the second abutment surface, the second connecting surface and the first abutment surface, or the another connecting surface and the second abutment surface, various types of gun barrel configurations can be accommodated.

According to an additional feature of the invention, projections of the first and second abutment surfaces form an angle smaller than 180°. This feature facilitates engagement of the spacer bar and templates in desirable configurations.

According to important features of the invention, one end of the first template defines a first threaded hole and an opposite end thereof defines a second threaded hole, the first and second threaded holes each extending between the first planar surface and the second stop surface; one end of the second template defines a first threaded aperture and an opposite end thereof defines a second threaded aperture, the first and second apertures each extending between the another planar surface and the another connecting surface; and one end of the spacer bar defines one threaded hole and an opposite end thereof defines another threaded hole, the one and another threaded holes each intersecting the first abutment surface. The threaded holes and apertures accommodate screws for retaining the templates and spacer bar in desired configurations.

According to another feature, the gun jig further includes a separator bar having a pair of endwalls and defining one abutment surface extending between the pair of endwalls, another abutment surface extending between the pair of endwalls, and a spacer surface extending between the pair of endwalls and joining the one and another abutment surfaces. By suitably and selectively engaging the separator bar with the templates and spacer bar still other gun barrel configurations can be accommodated.

According to further features of the invention, one end of the separator bar defines one threaded aperture and an opposite end thereof defines another threaded aperture, the one and another threaded apertures each intersecting the another abutment surface, and the spacer surface and the intermediate surface have substantially different uniform widths. The threaded apertures in the separator bar accommodate screws for mounting thereof to the templates and the spacer and intermediate surfaces of different width facilitate the creation of jig configurations for use with a variety of gun barrel types.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
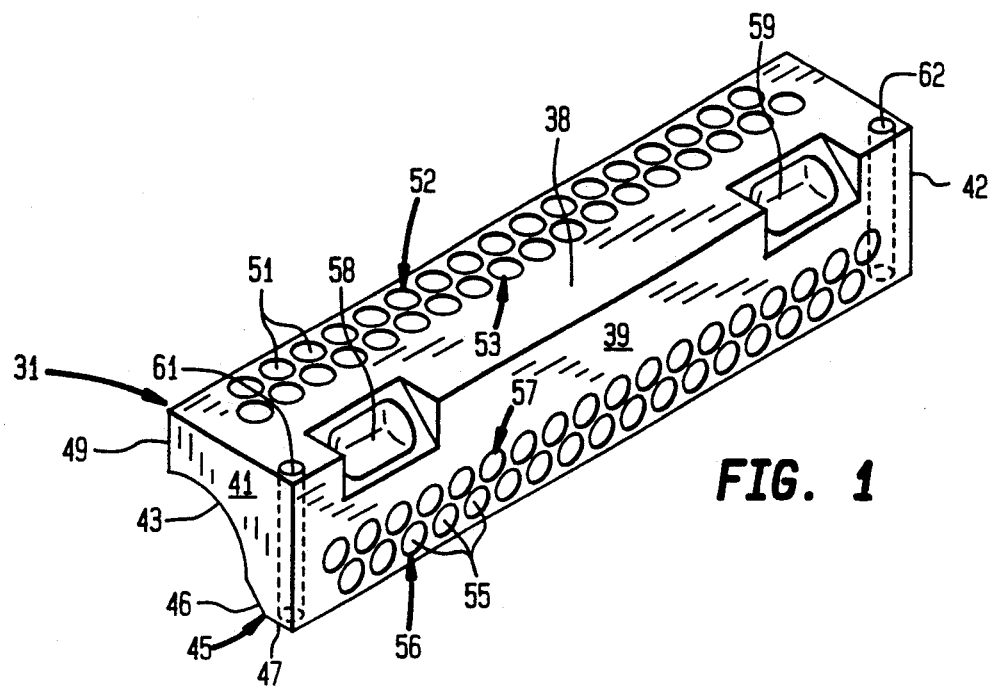
FIG. 1 is a perspective view of a one template component of a gun jig according to the invention.
Figure 2:
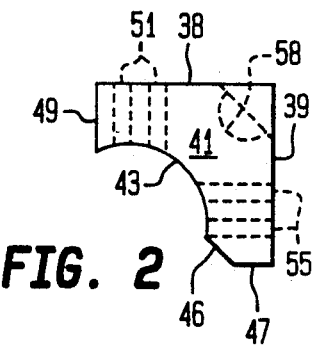
FIG. 2 is a left end view of the template shown in FIG. 1.
Figure 3:
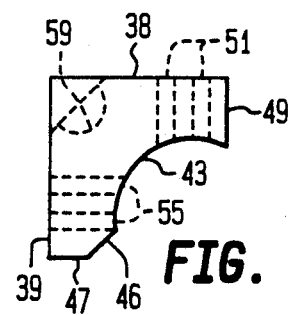
FIG. 3 is a right end view of the template shown in FIG. 1.
Figure 4:
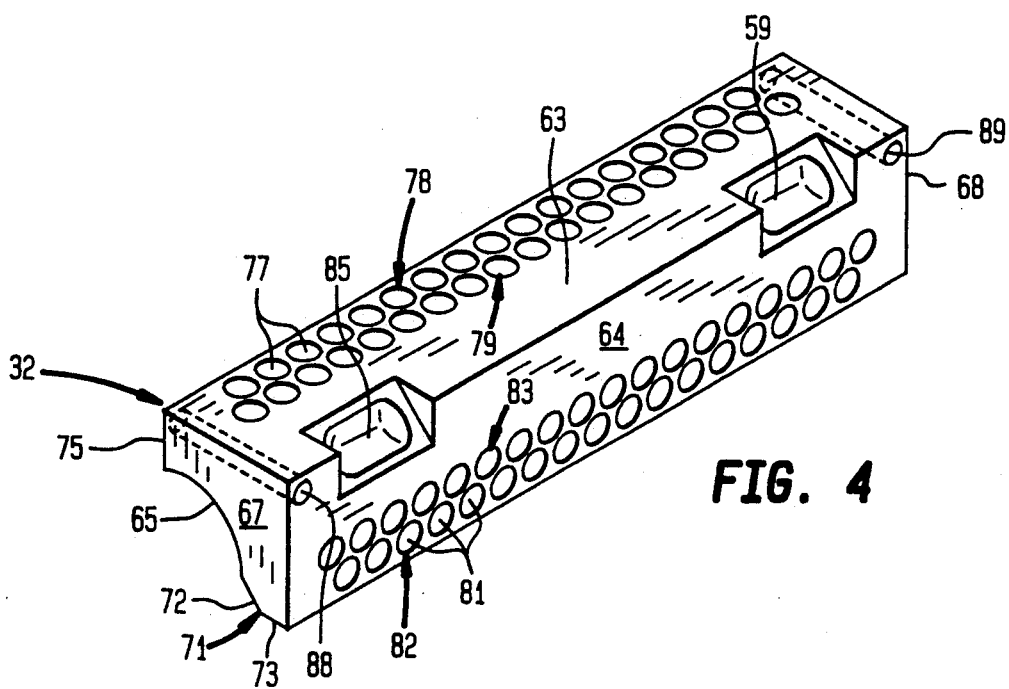
FIG. 4 is a perspective view of another template component of a gun jig according to the invention.
Figure 5:
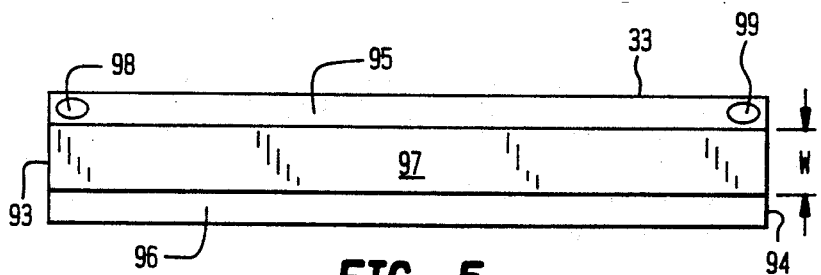
FIG. 5 is a top view of a spacer bar component of a gun jig according to the invention.
Figure 6:
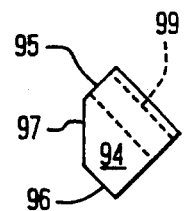
FIG. 6 is an end view of the spacer bar component shown in FIG. 5.
Figure 7:
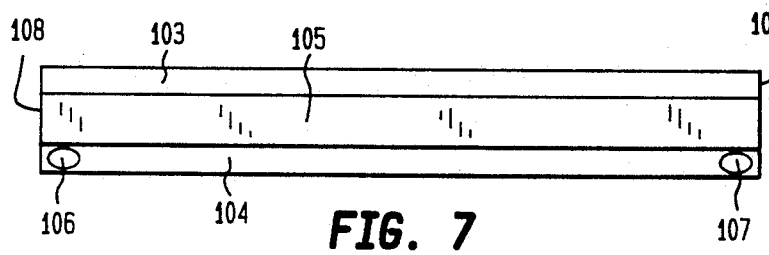
FIG. 7 is a top view of a separator bar component of a gun jig according to the invention.
Figure 8:
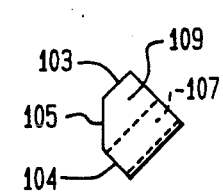
FIG. 8 is an end view of the separator bar component shown in FIG. 7.
Figure 9:
FIG. 9 is a top view of an auxiliary bar component of a gun jig according to the invention.
Figure 10:
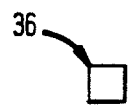
FIG. 10 is an end view of the auxiliary bar component shown in FIG. 9.
Figure 11:
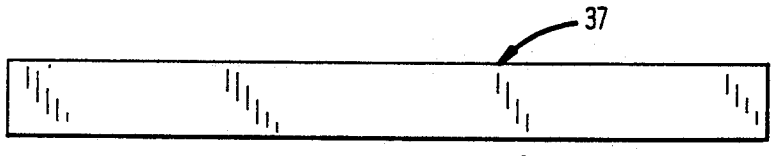
FIG. 11 is a top view of another auxiliary bar component of a gun jig according to the invention.
Figure 12:
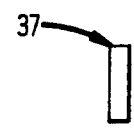
FIG. 12 is an end view of the auxiliary bar component shown in FIG. 11.

A gun jig of the invention includes a plurality of complementary components including a first template body 31 shown in FIGS. 1-3, a second template body 32 shown in FIG. 4, a spacer bar 33 shown in FIGS. 5 and 6 and a separator bar 34 shown in FIGS. 7 and 8. Additional components include auxiliary spacer bars 36, 37 shown, respectively, in FIGS. 9 and 10 and FIGS. 11 and 12. The auxiliary bar 36 is of square cross section as illustrated in FIG. 10 while the auxiliary bar 37 is of rectangular cross section as shown in FIG. 12.

Preferably formed of aluminum, the first template 31 is an elongated body having a first planar surface 38 and a second planar surface 39 intersecting with and perpendicular to the first planar surface 38. The first and second planar surfaces 38, 39 extend between a first end surface 41 and a second end surface 42 of the template 31. Also extending between the first and second end surfaces 41, 42 is a first arcuately recessed surface 43 opening away from the planar surfaces 38, 39. Also extending between the first end surface 41 and second end surface 42 is a first connecting surface 45 including a first stop surface 46 joined to the arcuate surface 43 and a second stop surface 47 joined to the second planar surface 39. The first stop surface 46 and the second stop surface 47 are joined at an obtuse angle along peripheral edges that extend between the first and second end surfaces 41, 42. Connecting the first planar surface 38 to the arcuate surface 43 is a second connecting surface 49 that also extends between the first and second end surfaces 41, 42 and is perpendicular to the first planar surface 38.

Formed in the first template 31 are a first plurality of guide holes 51 including a first row 52 of guide holes spaced apart between the first and second end surfaces 41, 42 and a second row 53 of guide holes spaced apart between the first and second end surfaces 41, 42 and parallel to the first row 52. The guide holes 51 extend between the first planar surface 38 and the arcuate surface 43. Also formed in the template body 31 are a second plurality of guide holes 55 including a first row 56 of guide holes spaced apart between the first and second end surfaces 41 and the second row 57 of guide holes spaced apart between the end surfaces 41, 42 and parallel to the first row 56. The second guide holes 55 extend between the second planar surface 39 and the arcuate surface 43. Also formed in the first template body 31 are a first concave clamping surface 58 intersecting the first planar surface 38 and the second planar surface 39 between the first plurality of guide holes 51 and the second plurality of guide holes 55 and a second concave clamping surface 59 also intersecting the first planar surface 38 and the second planar surface 39 between the first plurality of guide holes 51 and the second plurality of guide holes 55. The first and second clamping surfaces 58, 59 are spaced apart on the first template body 31 between the first and second end surfaces 41, 42. Also defined in one end of the first template body 31 is a first threaded hole 61 extending between the first planar surface 38 and the second stop surface 47. A second threaded hole 62 is defined in an opposite end of the first template body 31 and also extends between the first planar surfaces 38 and the second stop surface 47.

The second template body 32 is substantially identical to the first template body 31 and having one planar surface 63; another planar surface 64 intersecting with and perpendicular to the one planar surface 63; a second arcuately recessed surface 65 opening away from the planar surfaces 63, 64; one end surface 67 and another end surface 68 disposed, respectively, at opposite ends of the surfaces 63–65; one connecting surface 71 formed by one stop surface 72 and another stop surface 73 both extending between the end surfaces 67, 68 and joined at an obtuse angle to connect the another planar surface 64 and the second arcuate surface 65; and another connecting surface 75 connecting the arcuate surface 65 and the one planar surface 63 and perpendicular thereto. Also formed in the second template body 32 are a first plurality of guide apertures 77 including parallel first and second rows 78, 79 of apertures both spaced apart between the end surfaces 67, 68 and a second plurality of guide apertures 81 including parallel first and second rows 82, 83 of apertures both spaced apart between the end surfaces 67, 68. The first guide apertures 77 extend between the one planar surface 63 and the second arcuate surface 65 while the second guide apertures 81 extend between the another planar surface and the second arcuate surface 65. Spaced apart between the end surfaces 67, 68 and intersecting the one planar surface 63 and the another planar surface 64 between the first and second apertures 77, 81 are one concave clamping surface 85 and another concave clamping surface 86. The one difference between the first and second template bodies 31, 32 is that first and second threaded apertures 88, 89 formed in opposite ends of the second template body 32 extend between the another planar surface 64 and the another connecting surface 75 rather than between the one planar surface 63 and the another stop surface 73.

The spacer bar 33 (FIGS. 5, 6) has perpendicularly joined surfaces 91, 92 extending between a first endwall 93 and a second endwall 94. Also extending between the endwalls 93 and 94 are a first abutment surface 95 joined to the surface 92 and an intermediate surface 97 joining the first and second abutment surfaces 95, 96. Formed in opposite ends of the spacer bar 33 and intersecting the first abutment surface 95 are, respectively, one threaded hole 98 and another threaded hole 99.

The separator bar 34 (FIGS. 7 and 8) is a substantially smaller, identically shaped version of the spacer bar 33 and includes perpendicularly oriented surfaces 101 and 102, one abutment surface 103 joined to the surface 101 another abutment surface 104 joined to the surface 102 and a spacer surface 105 joining the one and another abutment surfaces 103, 104. Each of the surfaces 101-105 extend between one and another endwalls 108, 109 of the separator bar 34. Formed in opposite ends of the separator bar 34 and intersecting the another abutment surface 104 are, respectively, one threaded aperture 106 and another threaded aperture 107. The separator bar 34 is a smaller version of the spacer bar 33 such that the intermediate surface 97 has a width W greater than the width w of the spacer surface the second connecting surface 49; the one and another stop surfaces 72, 73; the another connecting surface 75, the first and second abutment surfaces 95, 96 and the one and so as to be conforming surfaces during use of the components as described below.

OPERATION

Figure 13:
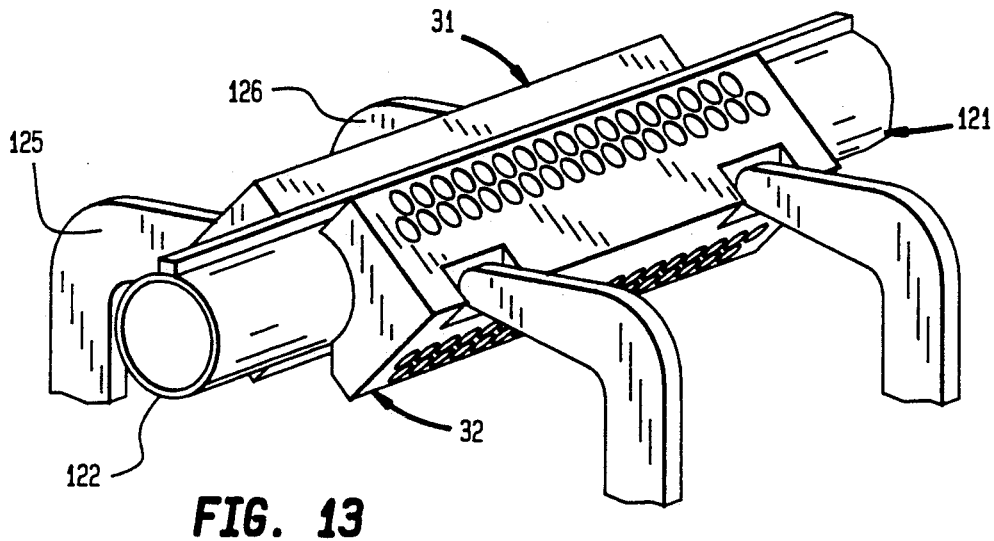
FIG. 13 is a perspective view of one gun jig setup according to the invention.
Figure 14:
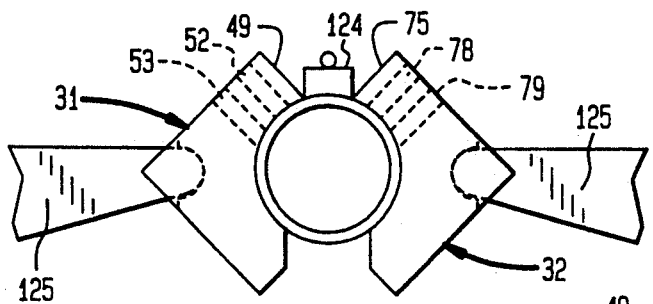
FIG. 14 is an end view of the gun jig setup shown in FIG. 13.

During use of the invention to port a single barreled shotgun 121 (FIGS. 13, 14) a calculation is first performed to determine both the location and number of ports to be drilled into a barrel 122. After the location of ports is determined, a strip of masking tape 123 is applied to the barrel 22 adjacent to the outermost port location. Next, the gun 121 is immobilized in a suitable vise (not shown) and the first and second template bodies 31, 32 are positioned over the barrel 122 and tape 123 with lower edges of the second connecting surface 49 and the another connecting surface 75 engaging a gun barrel rib 124. To retain the template bodies 31, 32 in proper positions, a pair of C-clamps 125, 126 are tightened against, respectively, the concave clamping surfaces 58, 85 and 59, 86. Any tendency of the templates 31, 32 to rotate on the barrel 122 is diminished by the masking tape 123. With the templates 31, 32 positioned as shown in FIGS. 13, 14, conventional bushings and bits (not shown) are used to drill ports in the barrel 122 utilizing predetermined holes the first and second rows 52, 53 in the template 31 and predetermined apertures of the first and second rows 77, 78 in the second template 32.

Figure 15:
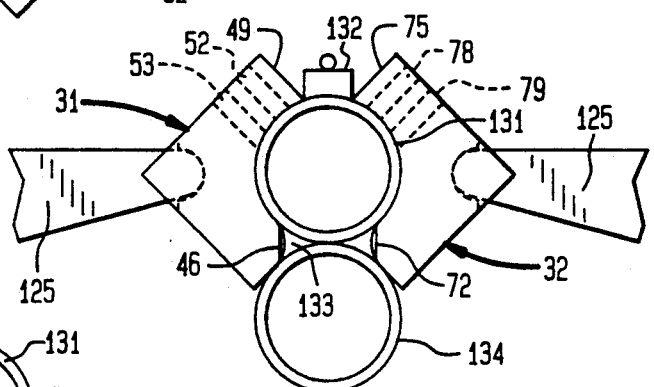
FIGS. 15-21 are end views of other gun jig setups according to the invention.

FIG. 15 illustrates the jig setup for porting an upper barrel 131 of an over-under shotgun having a lower barrel 134, a top rib 132 and a barrel connecting web 133. The templates 31, 32 are retained by the C-clamps 125, 126 in the positions shown with the lower edges of the surfaces 49, 75 engaging the top rib 132 and the connecting web 133 engaged by the first stop surface 46 of the template 31 and the one stop surface 72 of the template 32. With the templates 31, 32 properly positioned and retained by clamps 125, 126; the first and second rows 52, 53 of guide holes in the template 31 and the first and second rows 78, 79 of guide apertures in the second template 32 are used to drill ports at predetermined positions in the upper barrel 131.

Figure 16:
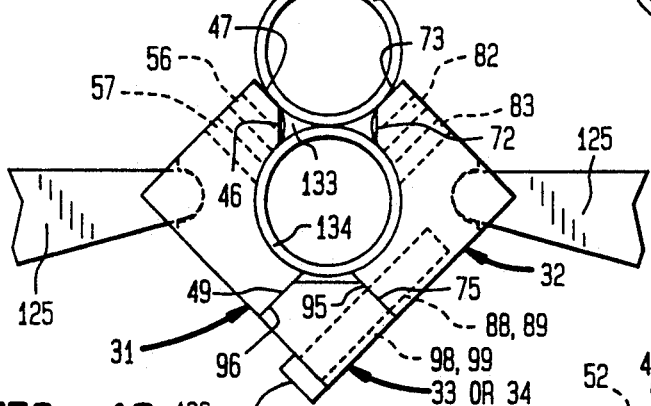

The lower barrel 134 is ported with the jig setup illustrated in FIG. 16. First, a pair of set screws 136 are turned into, respectively, the threaded holes 98, 99 in the spacer bar 33 and the threaded holes 88, 89 in the second template 32. Next, the engaged components 32 and 33 and the first template 31 are positioned over the lower barrel 134 with the connecting web 133 engaged by the first stop surface 46 on the first template 31 and the one stop surface 72 on the second template 32 and the first and second abutment surfaces 95, 96 on the spacer bar 33 engaged, respectively, by the another connecting surface 75 on the second template 32 and the second connecting surface 49 on the first template 31. With the templates 31, 32 retained in position by the C-clamps 125, 126, ports are drilled into the lower barrel 134 utilizing the first and second rows 56, 57 of guide holes in the first template 31 and the first and second rows 82, 83 of guide apertures in the second template 32. When porting a shotgun (not shown) with a barrel of smaller diameter than the barrel 134, the smaller separator bar 34 is substituted for the spacer bar 33 in the setup shown in FIG. 16.

Figure 17:
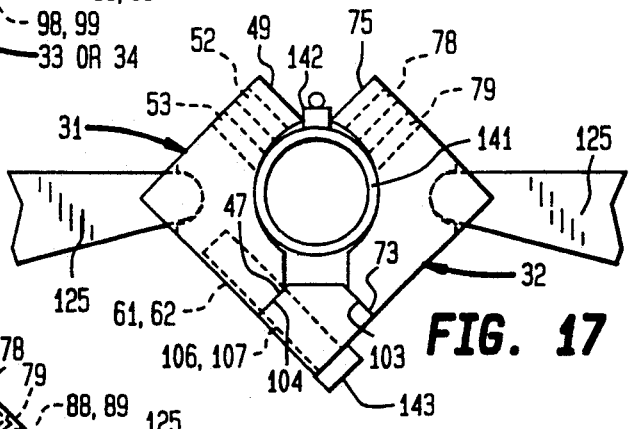

FIG. 17 illustrates another jig setup for porting a shotgun having a single barrel 141 of lesser diameter than the barrel 122 (FIG. 14) and an upper longitudinal rib 142. First a pair of set screws 143 are turned into, respectively, the threaded holes 106, 107 in the separator bar 34 and the threaded hole 61, 62 in the first template 31 to produce engagement between the second stop surface 47 on the first template 31 and the another abutment surface 104 on the separator bar 34. Next, the C-clamps 125, 126 are used to secure the first and second templates 31, 32 over the barrel 141 with the lower edges of the second connecting surface 49 on the first template 31 and the another connecting surface 75 on the second template 32 engaging the rib 42 and the one abutment surface 103 on the separator bar 34 engaging the another stop surface 73 on the second template 32. Finally, ports are drilled into the barrel 141 utilizing the first and second rows 52, 53 of guide holes in the first template 31 and the first and second rows 78, 79 of guide apertures in the second template 32. When porting a shotgun (not shown) having a single barrel of even greater diameter than the barrel 141, the larger spacer bar 33 is substituted for the separator bar 34 in the setup shown in FIG. 17.

Figure 18:
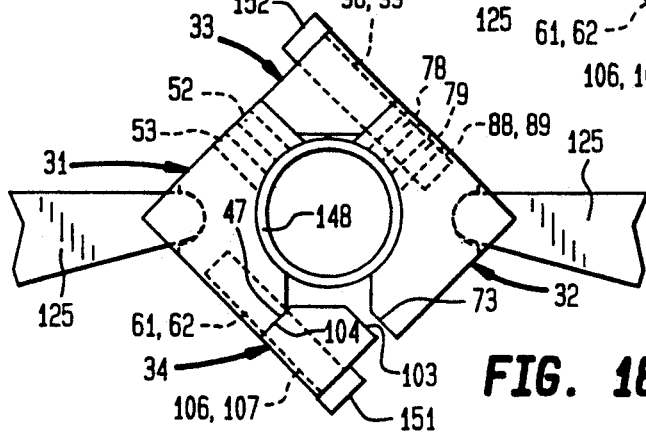

FIG. 18 illustrates a setup for porting a single barrel 148 of a shotgun having no longitudinal rib. First, a pair of set screws 151 are turned into, respectively, the threaded holes 106, 107 of the separator bar 34 and the threaded holes 61, 62 of the first template 31 to produce engagement between the second stop surface 47 of the first template 31 and the another abutment surface 104 of the separator bar 34. Next, a pair of set screws 152 are turned into, respectively, the threaded holes 98, 99 of the spacer bar 33 and the threaded holes 88, 89 of the second template 32 until the another connecting surface 75 on the second template 32 engages the first abutment surface 95 on the spacer bar 33. The C-clamps 125, 126 then are used to secure the connected pairs of components 31, 34 and 32, 33 over the barrel 148 with the second connecting surface 49 on the first template 31 engaging the second abutment surface 96 on the spacer bar 33 and the another stop surface 73 on the second template 32 engaging the one abutment surface 103 on the separator bar 34. Finally, ports are drilled in predetermined positions in the barrel 148 utilizing the first and second rows 52, 53 of guide holes in the first template 31 and the first and second rows 78, 79 of guide apertures in the second template 32.

Figure 19:
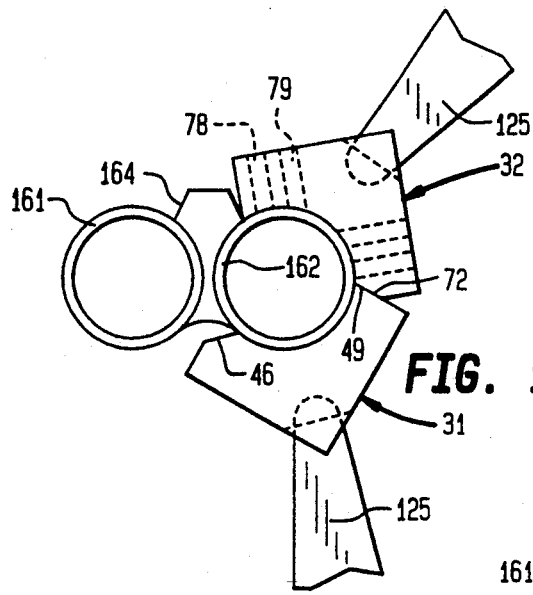

Left and right barrels 161, 162, respectively, of a side by side shotgun having a connecting rib 164 are ported with a setup shown in FIG. 19. The first and second templates 31, 32 are positioned over the right barrel 162 with the inner edge of the another connecting surface 75 on the second template 32 engaging an upper portion of the rib 164, the one stop surface 72 of the template 32 engaging the second connecting surface 49 of the template 31, and the inner edge of the first stop surface 46 on the first template 31 engaging a lower portion of the rib 164. After placement of the C-clamps 125, 126 with their yoke portions projecting around the outer surface of the barrel 162, the first and second rows 78, 79 of guide apertures in the second template 32 are used to drill ports in an upper portion of the barrel 162. Porting of the left barrel 161 is accomplished in a similar manner after positioning of the first and second templates 31, 32 and the clamps 125, 126 in a similar manner on the left barrel 161.

Figure 20:
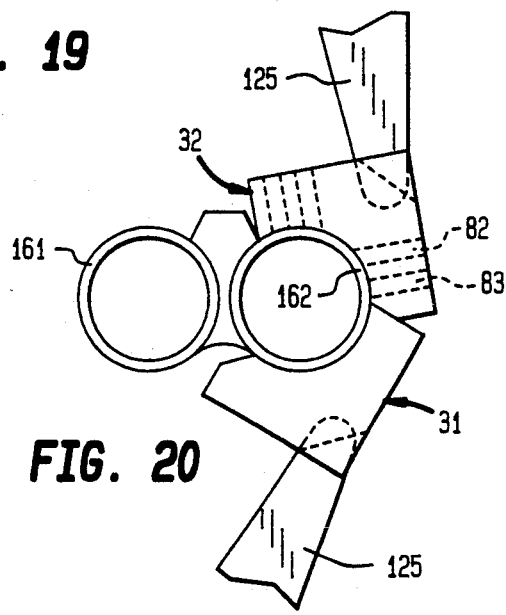

To port a side portion of the right barrel 162, a setup shown in FIG. 20 is used. The FIG. 20 setup is identical to that shown in FIG. 19 except that the C-clamps 125, 126 are reversed with their yoke portions projecting inwardly around the left barrel 161. That positioning of the C-clamps 125, 126 provides access to the first and second rows 82, 83 of guide apertures in the second template 32. Again, side porting of the left barrel 161 is accomplished with the same setup of the first and second templates 31, 32 on the left barrel 161 and the clamps 125 similarly positioned around the right barrel 162.

Figure 21:
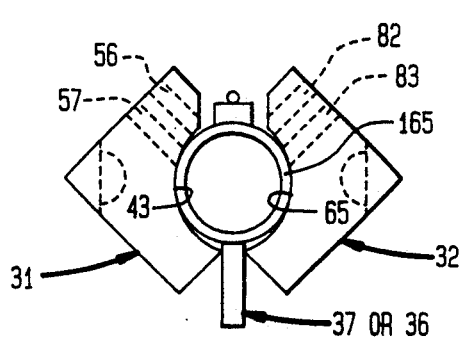

FIG. 21 shows yet another setup for porting a shotgun having a single barrel 65 of different diameter than those shown in FIGS. 14 and 18. The first and second templates 31, 32 are clamped in position with the arcuate surfaces 43, 65 engaging the barrel 165 and the inner edges of the second connecting surface 49 on the first template 31 and the another connecting surface 75 on the second template 32 engaging the auxiliary bar 37. Porting is then accomplished utilizing the first and second rows 56, 57 of guide holes in the first template 31 and the first and second rows 82, 83 of guide apertures in the second template 32. The auxiliary bar 36 can be substituted for the auxiliary bar 37 to accommodate other barrel diameters.

Figure 22:
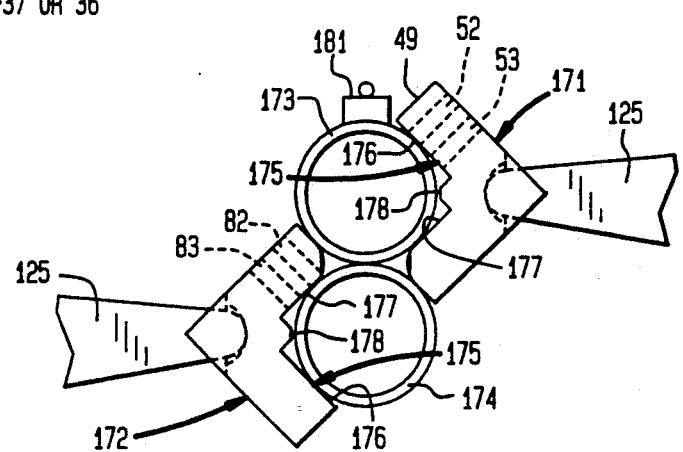
FIG. 22 is an end view illustrating another gun jig embodiment of the invention.

FIG. 22 illustrates a jig setup utilizing modified first and second templates 171, 172 for porting an over-under shotgun having an upper barrel 173 and a lower barrel 174. The templates 171, 172 are identical, respectively, to the templates 31, 34 except that the arcuate surfaces 43, 65 are replaced by recesses 175 formed by perpendicularly oriented planar surfaces 176, 177 joined by an outwardly projecting knife edge 178. With the recess 175 in the first template 171 engaging the upper barrel 173, the inner edge of the second connecting surface 49 engaging a longitudinal rib 181 on the upper barrel 173, the first stop surface 46 engaging a connecting web 182, the recess 175 in the second template 172 engaging the lower barrel 174, the one stop surface 72 engaging the connecting web 182, C-clamps are applied to retain the templates 171, 172 in position. Next, first and second rows 52, 53 of guide holes in the first template 171 are used to port one side of the upper barrel 173 and first and second rows 82, 83 of guide apertures in the second template 172 are used to port one side of the lower barrel 174. Opposite side of the barrels 173, 174 are similarly ported after reversing the positions of the first and second templates 171, 172.

Obviously, many modifications and variations of the present invention are possible in light of the above teachings. It is to be understood, therefore, that the invention can be practiced otherwise than as specifically described.

What is claimed is:

1. A gun jig comprising:
    a first template defining first and second end surfaces, a first substantially planar surface extending between said first and second end surfaces, a second substantially planar surface oriented substantially perpendicular to said first planar surface and extending between said first and second end surfaces, a first recessed surface extending between said first and second end surfaces, a first plurality of guide holes extending between said first planar surface and said first recessed surface, a second plurality of guide holes extending between said second planar surface and said first recessed surface, a first connecting surface extending between said first and second end surfaces and joining said first planar surface and said first recessed surface, and a second connecting surface extending between said first and second end surfaces and joining said second planar surface and said first recessed surface; and
    a second template defining one and another end surfaces, one substantially planar surface extending between said one and another end surfaces, another substantially planar surface extending between said one and another end surfaces, a second recessed surface extending between said one and another end surfaces, a first plurality of guide apertures extending between said one planar surface and said second recessed surface, a second plurality of guide apertures extending between said another planar surface and said second recessed surface, and another connecting surface extending between said one and another end surfaces and joining said another planar surface and said second recessed surface.

2. A gun jig according to claim 1 wherein said first and second recessed surfaces are substantially arcuate surfaces.

3. A gun jig according to claim 2 wherein each of said first and second plurality of guide holes comprises a first row of guide holes spaced apart between said first and second end surfaces, and a second row of guide holes arranged substantially parallel to said first row of guide holes; each of said first and second plurality of guide apertures comprises a first row of guide apertures spaced apart between said one and another end surface, and a second row of guide apertures substantially parallel to said first row of guide apertures.

4. A gun jig according to claim 3 wherein said first template further defines a first clamping surface means intersecting said first and second planar surfaces between said first and second plurality of guide holes, and said second template further defines a second clamping surface means intersecting said one and another planar surfaces between said first and second guide apertures.

5. A gun jig according to claim 4 wherein said first clamping surface means comprises first and second concave surfaces spaced apart between said first and second end surfaces, and said second clamping surface means comprises one and another concave surfaces spaced apart between said one and another end surfaces.

6. A gun jig according to claim 4 including clamp means for engaging said clamping surface means to clamp said first and second templates into positions with said first and second arcuate surfaces engaging diametrically opposed portions of a gun barrel.

7. A gun jig according to claim 2 wherein said first connecting surface comprises a first stop surface extending between said first and second end surfaces, and a second stop surface joining said first stop surface and extending between said first and second end surfaces; and said one connecting surface comprises one stop surface extending between said one and another end surfaces, and another stop surface joining said one stop surface and extending between said one and another end surfaces.

8. A gun jig according to claim 7 including a spacer bar having first and second endwalls and defining a first abutment surface extending between said endwalls, a second abutment surface extending between said endwalls, and an intermediate surface extending between said endwalls and joining said first and second abutment surfaces.

9. A gun jig according to claim 8 wherein said first stop surface and said first abutment surface are conforming surfaces, and said one stop surface and said second abutment surface are conforming surfaces.

10. A gun jig according to claim 9 wherein said first stop surface, said first and second abutment surfaces, and said one stop surface are substantially planar surfaces.

11. A gun jig according to claim 10 wherein projections of said first and second abutment surfaces form an angle smaller than 180°.

12. A gun jig according to claim 8 wherein second connecting surface and said first abutment surface are conforming surfaces, and said another connecting surface 1 and said second abutment surface are conforming surfaces.

13. A gun jig according to claim 12 wherein said first stop surface and said first abutment surface are conforming surfaces, and said one stop surface and said second abutment surface are conforming surfaces.

14. A gun jig according to claim 13 wherein said first stop surface, said first and second abutment surfaces, said one stop surface, said second connecting surface, and said another connecting surface are substantially planar surfaces.

15. A gun jig according to claim 8 wherein one end of said first template defines a first threaded hole and an opposite end thereof defines a second threaded hole, said first and second threaded holes each extending between said first planar surface and said second stop surface; one end of said second template defines a first threaded aperture and an opposite end thereof defines a second threaded aperture, said first and second apertures each extending between said another planar surface and said another connecting surface; and one end of said spacer bar defines one threaded hole and an opposite end thereof defines another threaded hole, said one and another threaded holes each intersecting said first abutment surface.

16. A gun jig according to claim 15 wherein said first and second threaded holes, said first and second threaded apertures, and said one and another threaded holes are equally spaced apart.

17. A gun jig according to claim 16 including a separator bar having a pair of endwalls and defining one abutment surface extending between said pair of endwalls, another abutment surface extending between said pair of endwalls, and a spacer surface extending between said pair of endwalls and joining said one and another abutment surfaces.

18. A gun jig according to claim 17 wherein said first stop surface and said one abutment surface are conforming surfaces, said one stop surface and said another abutment surface are conforming surfaces, said second connecting surface and said one abutment surfaces are conforming surfaces, and said another connecting surface and said another abutment surfaces are conforming surfaces.

19. A gun jig according to claim 18 wherein said first stop surface, said one abutment surface, said one stop surface, said another abutment surface, said second connecting surface, and another connecting surface, are substantially planar surfaces.

20. A gun jig according to claim 19 wherein said one and another abutment surfaces form an angle smaller than 180°.

21. A gun jig according to claim 20 wherein one end of said separator bar defines one threaded aperture and an opposite end thereof defines another threaded aperture, said one and another threaded apertures each intersecting said another abutment surface, and said one and another threaded apertures and said one and another threaded holes are equally spaced apart; and said spacer surface and said intermediate surface have substantially different uniform widths.

* * * * *